United States Patent
Celik et al.

(10) Patent No.: US 11,359,859 B2
(45) Date of Patent: Jun. 14, 2022

(54) SYSTEM FOR PRE-PURIFICATION OF A FEED GAS STREAM

(71) Applicants: Cem E. Celik, Grand Island, NY (US); Arthur C. Selover, Town of Tonawanda, NY (US); Sesha Hari Vemuri, Tonawanda, NY (US)

(72) Inventors: Cem E. Celik, Grand Island, NY (US); Arthur C. Selover, Town of Tonawanda, NY (US); Sesha Hari Vemuri, Tonawanda, NY (US)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 0 days.

(21) Appl. No.: 17/231,648

(22) Filed: Apr. 15, 2021

(65) Prior Publication Data

US 2022/0057137 A1    Feb. 24, 2022

Related U.S. Application Data

(60) Provisional application No. 63/067,539, filed on Aug. 19, 2020.

(51) Int. Cl.
*B01D 53/04* (2006.01)
*B01D 53/26* (2006.01)
(Continued)

(52) U.S. Cl.
CPC ...... *F25J 3/04169* (2013.01); *B01D 53/0415* (2013.01); *B01D 53/261* (2013.01);
(Continued)

(58) Field of Classification Search
CPC ........ B01D 2253/108; B01D 2257/502; B01D 2257/108; B01D 2258/06; B01D 53/047;
(Continued)

(56) References Cited

U.S. PATENT DOCUMENTS

| 5,202,096 A | * | 4/1993 | Jain | ...................... B01D 53/864 422/612 |
| 5,906,675 A | | 5/1999 | Jain et al. | |

(Continued)

FOREIGN PATENT DOCUMENTS

| EP | 0 799 633 A1 * | 10/1997 | ........... F25J 3/04181 |
| EP | 0904823 A2 | 3/1999 | |

(Continued)

*Primary Examiner* — Timothy C Vanoy
(74) *Attorney, Agent, or Firm* — Robert J. Hampsch

(57) ABSTRACT

A system and method of pre-purification of a feed gas stream is provided that is particularly suitable for pre-purification of a feed air stream in cryogenic air separation unit. The disclosed pre-purification systems and methods are configured to remove substantially all of the hydrogen, carbon monoxide, water, and carbon dioxide impurities from a feed air stream and is particularly suitable for use in a high purity or ultra-high purity nitrogen plant. The pre-purification systems and methods preferably employ two or more separate layers of hopcalite catalyst with the successive layers of the hopcalite separated by a zeolite adsorbent layer that removes water and carbon dioxide produced in the hopcalite layers. Alternatively, the pre-purification systems and methods employ a hopcalite catalyst layer and a noble metal catalyst layer separated by a zeolite adsorbent layer that removes water and carbon dioxide produced in the hopcalite layer.

14 Claims, 4 Drawing Sheets

(51) Int. Cl.
*B01J 8/04* (2006.01)
*B01J 21/04* (2006.01)
*B01J 23/34* (2006.01)
*B01J 23/44* (2006.01)
*B01J 23/72* (2006.01)
*F25J 3/04* (2006.01)

(52) U.S. Cl.
CPC ............. *B01J 8/0453* (2013.01); *B01J 21/04* (2013.01); *B01J 23/34* (2013.01); *B01J 23/44* (2013.01); *B01J 23/72* (2013.01); B01D 2253/104 (2013.01); B01D 2253/108 (2013.01); B01D 2256/10 (2013.01); B01D 2256/12 (2013.01); B01D 2257/108 (2013.01); B01D 2257/502 (2013.01); B01D 2257/504 (2013.01); B01D 2257/80 (2013.01); B01D 2259/4146 (2013.01); B01D 2259/4148 (2013.01); *F25J 2205/60* (2013.01); *F25J 2205/82* (2013.01); *F25J 2210/40* (2013.01)

(58) Field of Classification Search
CPC .......... B01D 2253/104; B01D 53/0415; B01D 53/261; B01D 2256/12; B01D 2258/404; B01D 2257/702; B01D 2255/20761; B01D 2255/9022; B01D 2256/10; B01D 2259/4145; B01D 2259/40081; B01D 53/8671; B01D 2255/9025; B01D 2255/2073; B01D 2255/1023; B01J 23/72; B01J 21/04; B01J 8/0453; B01J 23/34; B01J 23/44; F25J 2205/60; F25J 3/04169; F25J 2205/82; F25J 2210/40; F25J 2205/64

See application file for complete search history.

(56) References Cited

U.S. PATENT DOCUMENTS

| | | | |
|---|---|---|---|
| 6,048,509 A | 4/2000 | Kawai et al. | |
| 6,093,379 A * | 7/2000 | Golden | B01D 53/04 423/247 |
| 8,940,263 B2 | 1/2015 | Golden et al. | |
| 11,173,451 B1 * | 11/2021 | Lau | B01J 35/1061 |
| 2003/0064014 A1 | 4/2003 | Kumar et al. | |
| 2022/0054976 A1 * | 2/2022 | Mancini | B01D 53/864 |

FOREIGN PATENT DOCUMENTS

| | | |
|---|---|---|
| EP | 2662653 A1 | 11/2013 |
| JP | H04256418 A | 9/1992 |
| KR | 101190461 B1 | 10/2012 |

* cited by examiner

SYSTEM FOR PRE-PURIFICATION OF A FEED GAS STREAM

CROSS REFERENCE TO RELATED APPLICATIONS

This application claims the benefit of and priority to U.S. provisional patent application Ser. No. 63/067,539 filed Aug. 19, 2020 the disclosure of which is incorporated by reference.

TECHNICAL FIELD

The present invention relates to a system and method for removing impurities from a feed gas stream, and more particularly, to a method and apparatus for removing water, carbon dioxide, hydrogen, and carbon monoxide from a feed gas stream prior to its introduction into a cryogenic distillation system. More specifically, the present invention relates to a system and method for pre-purification of a feed air stream in a cryogenic air separation unit.

BACKGROUND

Adsorption is well established technology for the purification of gases and for the treatment of fluid waste streams. Purification and separation of atmospheric air comprises one of the main areas in which adsorption methods are widely used. For an increase of their efficiency, novel and improved pre-purification systems and methods are continuously being developed.

One of the areas of strong commercial and technical interest represents pre-purification of air before its cryogenic distillation. Conventional air separation units for the production of nitrogen ($N_2$) and oxygen ($O_2$) and also for argon (Ar) by the cryogenic separation of air are basically comprised of two or at least three, respectively, integrated distillation columns which operate at very low temperatures. Due to these low temperatures, it is essential that water vapor ($H_2O$), and carbon dioxide ($CO_2$) is removed from the compressed air feed to an air separation unit to prevent freeze up of components within the air separation unit Current commercial methods for the pre-purification of feed air include temperature and/or pressure swing adsorption units that employ layers of adsorbent materials together with optional catalytic pre-purification techniques. A pre-purification unit (PPU) situated upstream of the cryogenic distillation system is typically used that includes an upfront adsorbent layer to remove water, carbon dioxide as well as hydrocarbons and other contaminants including oxides of nitrogen. Such PPU may also optionally include one or more catalysts targeted to remove one or more contaminants followed by a final adsorbent layer downstream of the optional catalysts to remove the contaminants produced by the catalysis process.

If not removed, water and carbon dioxide present in the feed air will freeze out and block heat exchangers employed for cooling the feed air prior to distillation in the cryogenic distillation columns. Removal of hydrocarbons and nitrous oxides is often required to ensure the safe operation of such cryogenic distillation systems that typically involve processing oxygen-rich streams.

Before entering the PPU, atmospheric air is typically compressed to an elevated pressure from about 0.45 MPa to 1.1 MPa, followed by a combination of cooling steps and removal of condensed water. The cooled feed air stream is then passed to a PPU where any remaining water and carbon dioxide are first removed by adsorption in a bed of a molecular sieve and/or activated alumina. The air stream exiting the bed of molecular sieve and/or activated alumina is substantially free of carbon dioxide, water, hydrocarbons, and nitrous oxide. Preferably, to avoid freeze-out, the content of water in the compressed and pre-purified air feed stream must be less than 0.1 ppm (part per million) while the content of carbon dioxide in the compressed and pre-purified air feed stream must be less than 1.0 ppm. From a safety perspective, the compressed and pre-purified air should be substantially free of heavy hydrocarbons and nitrous oxides.

In addition, some applications for the electronics industry and selected other industries require the removal of hydrogen and/or carbon monoxide from the feed air stream before processing the feed air stream in the cryogenic distillation system to produce a high purity or ultra-high purity nitrogen product. A conventional PPU having only a bed of molecular sieve and/or activated alumina is quite capable of removing carbon dioxide, water, hydrocarbons, and nitrous oxide from the cooled feed air. However, the activated alumina or molecular sieve are not effective for the substantial removal of carbon monoxide or hydrogen that may be present in the feed air.

Prior art techniques of removing carbon monoxide and hydrogen in such applications have used catalytic based pre-purification techniques within the PPU. For example, pre-purification processes requiring removal of hydrogen often use a noble metal containing catalyst such as a platinum or palladium containing catalyst material. Likewise, in applications requiring removal of carbon monoxide or removal of both carbon monoxide and hydrogen use of catalytic materials such as hopcalite with or without noble metal containing catalysts. As used herein, the term 'hopcalite' is not used as a tradename but rather is used generically to refer to a catalyst material that comprises a mixture of copper oxide and manganese oxide.

For example, U.S. Pat. No. 6,048,509 discloses a method and process utilizing a modified precious metal catalyst (platinum or palladium and at least one member selected from the group consisting of iron, cobalt, nickel, manganese, copper, chromium, tin, lead and cerium on alumina) for oxidation of carbon monoxide to carbon dioxide, followed by water removal in an adsorbent layer and carbon dioxide removal in a second adsorbent layer. An option for hydrogen removal is provided with a second noble metal containing catalyst layer followed by water removal in subsequent adsorbent layers.

Another example is highlighted in U.S. Pat. No. 6,093,379 which discloses a process for combined hydrogen and carbon monoxide removal consisting of a first layer to adsorb water and carbon dioxide on alumina or zeolite, and a second layer of a precious metal catalyst (palladium on alumina) to simultaneously oxidize carbon monoxide, adsorb the formed carbon dioxide and chemisorb hydrogen.

Other prior art references teach the use of other catalyst materials such as hopcalite to remove carbon monoxide and hydrogen. Two such examples of use of hopcalite for pre-purification to remove hydrogen from air are U.S. Patent Application Publication No. 2003/064014 (Kumar et al.) and U.S. Pat. No. 8,940,263 (Golden, et al.) The Kumar et al. reference shows that it has been well known for over 20 years that a hopcalite catalyst removes hydrogen and carbon monoxide from air, and is particularly useful for removing both carbon monoxide and hydrogen from a feed air stream during pre-purification in cryogenic air separation units. Golden, et al. also discloses the use of a single layer of hopcalite for removal of substantially all of the hydrogen and carbon monoxide. The examples in Golden et al. confirm what is taught in Kumar et al. that hydrogen is chemisorbed in the single layer of hopcalite material such that the use of a longer bed of hopcalite catalyst which translates to longer residence times of the dry gas in the hopcalite layer generally improves the hydrogen chemisorption process in the hopcalite material While the above-identified prior art pre-purification systems and methods target removal of impurities such as hydrogen, carbon monoxide, water, and carbon dioxide from feed air streams, the relative costs associated with pre-purification systems and methods remain high. Accordingly, there is a continuing need to improve such pre-purification systems and processes, particularly to reduce the costs of such pre-purification without sacrificing performance. In other words, there is a need for improved systems and methods for pre-purification of an incoming feed air stream to a cryogenic air separation unit, including substantial removal of hydrogen, carbon monoxide, water and carbon dioxide in the production of high purity or ultra-high purity nitrogen that has cost advantages and performance advantages over prior art pre-purification systems and methods.

SUMMARY OF THE INVENTION

The present invention may broadly be characterized as a method of purifying a gas stream to remove the hydrogen and carbon monoxide impurities present in the gas stream, the method comprising: (a) passing the gas stream substantially free of carbon dioxide and water through a first catalyst layer comprising a mixture manganese and copper oxides configured to remove at least some of the carbon monoxide and hydrogen from the gas stream and produce a first intermediate effluent; (b) passing the first intermediate effluent through an adsorbent layer disposed downstream of the first catalyst layer, the adsorbent layer configured to remove water and carbon dioxide from the intermediate effluent and produce a second intermediate effluent; and (c) passing the second intermediate effluent through a second catalyst layer disposed downstream of the adsorbent layer, the second catalyst layer configured to remove at least hydrogen from the second intermediate effluent to yield an intermediate purified stream. The method of purification is ideally suited for use in pre-purification of a feed air stream in an air separation unit. Optionally, a further step (d) may be included that involves passing the intermediate purified stream through a second adsorbent layer that is configured to remove water and carbon dioxide from the intermediate purified stream and produce a purified stream.

The present invention may also be characterized as a pre-purification vessel configured for use with an air-separation unit comprising: (i) a first purification section comprising at least one layer of adsorbent configured to remove water and carbon dioxide from the compressed feed air stream and yield a dry feed air stream substantially free of water and carbon dioxide; (ii) a second purification section disposed within the pre-purification vessel downstream of the first purification section, the second purification section comprising a first catalyst layer comprising a mixture manganese and copper oxides configured to remove at least some of the carbon monoxide and hydrogen from the dry feed air stream and produce a first intermediate effluent; an adsorbent layer disposed downstream of the first catalyst layer, the adsorbent layer configured to remove water and carbon dioxide from the first intermediate effluent and produce a second intermediate effluent; and a second catalyst layer disposed downstream of the adsorbent layer, the second catalyst layer configured to remove at least hydrogen from the second intermediate effluent to yield an intermediate purified air stream; and (iii) a third purification section disposed within the vessel downstream of the second purification section and comprising at least one other layer of adsorbent configured to remove water and carbon dioxide from the intermediate purified air stream and yield a dry, purified air stream substantially free of water, carbon dioxide, carbon monoxide and hydrogen.

In the preferred embodiments, the second catalyst layer is most preferably a noble metal based catalyst, such as a mixture of palladium and aluminum oxide (e.g. 0.5 wt % $Pd/Al_2O_3$) that is configured to remove hydrogen from the second intermediate effluent to yield the intermediate purified stream. The adsorbent layers are preferably a molecular sieve layer or a layer of alumina or both a molecular sieve layer and a layer of alumina.

BRIEF DESCRIPTION OF THE DRAWINGS

While the specification concludes with one or more claims specifically pointing out the subject matter that Applicants regard as the invention, it is believed that the present systems and methods for pre-purification of a feed gas stream will be better understood when taken in connection with the accompanying drawing in which:

DETAILED DESCRIPTION

Figure 1:
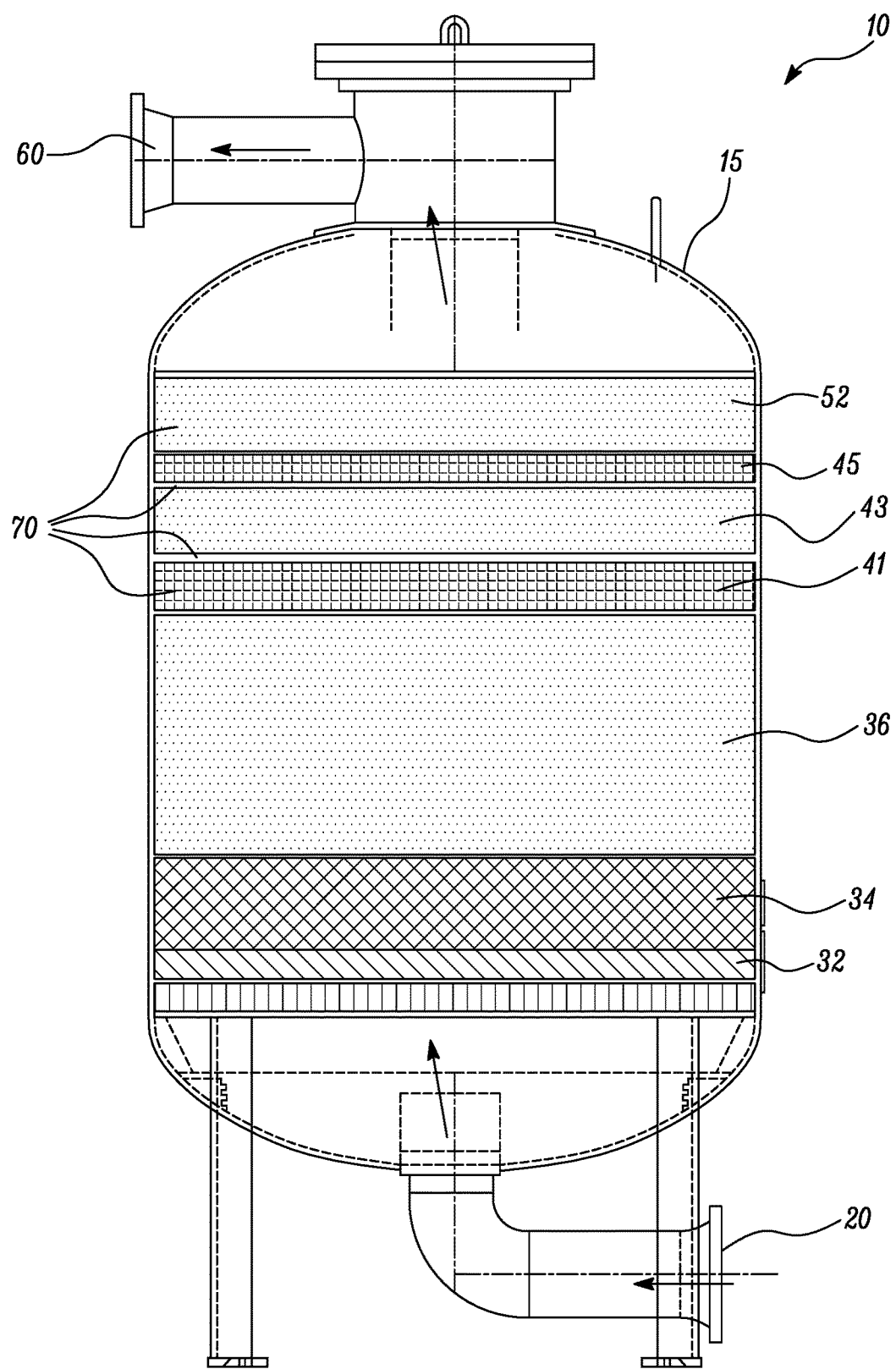
FIG. 1 depicts a partial, cross-section view of a section of a pre-purification unit or pre-purification vessel suitable for use in pre-purification of a feed air stream in a cryogenic air separation unit.

The present system and method for pre-purification embodies a process for removing gaseous impurities from a feed gas stream and is targeted for applications where the purified stream is subsequently introduced into a cryogenic distillation column such as cryogenic air separation. The disclosed pre-purification process comprises an adsorption and catalyst based process for removing water, hydrogen, carbon monoxide and carbon dioxide as well as other impurities from the feed stream gas.

The process comprises passing a feed stream gas containing these impurities through a multi-layer pre-purification vessel that is characterized as comprising at least three purification sections arranged in an adjacent manner such that the gas stream to be purified flows sequentially from the first purification section to the second purification section, and then to the third purification section all disposed within the pre-purification vessel. It is understood that the arrangement of the three purification sections and the individual layers of materials within each section may be oriented such that the flow is in an axial orientation of the pre-purification vessel or may be oriented such that the flow is in an radial direction within the pre-purification vessel. It is also understood that pre-purification units may include two or more pre-purification vessels in which at least one of the pre-purification vessels is used for pre-purification service removing impurities from the feed gas stream while at least one other pre-purification vessel is being regenerated, preferably with a purge or regeneration gas stream. The beds switch between pre-purification service and regeneration service periodically.

The first purification section of the pre-purifier vessel is configured to remove impurities such as water, carbon dioxide, and optionally other impurities such as heavy hydrocarbons and oxides of nitrogen. The first purification section of the pre-purifier vessel may be comprised of a molecular sieve or one or more layers of adsorbents such as activated alumina, silica gel or an X type zeolite such as NaX zeolite. The individual layers layer may also be a composite of these materials. For removal of hydrocarbon impurities a hydrocarbon adsorbent is often selected from the group consisting of types A and X zeolites and silica gel. Likewise, where removal of oxides of nitrogen are required, an adsorbent layer may include A, X, or Y type zeolites.

The second purification section of the pre-purifier vessel is configured to remove carbon monoxide and hydrogen from the gas stream exiting the first purification section, with the carbon monoxide preferably removed via catalysis and adsorption while the hydrogen generally removed by chemisorption, adsorption and catalysis. The degree to which hydrogen is removed by catalysis or via adsorption and/or chemisorption depends on the materials used within individual layers of the second purification section.

The third purification section of the pre-purifier unit is configured to further remove any water and carbon dioxide that exit the second purification section to produce a pre-purified gas stream substantially free of water, carbon dioxide, carbon monoxide, hydrogen, and other impurities. Similar to the first purification section, the third purification section may be comprised of one or more layers of adsorbents such as activated alumina, silica gel or an X type zeolite such as NaX zeolite. Individual layers layer may also be a composite of such materials.

As used herein, the phrase substantially free of hydrogen is a relative term that depends on the hydrogen content in the feed gas. For air pre-purification in a cryogenic air separation unit, substantially free of hydrogen would typically mean less than about 500 ppb hydrogen or less than 20% of the hydrogen content in the feed gas, whichever concentration is lower. Likewise, the phrase substantially free of carbon monoxide is also a relative term that depends on the carbon monoxide content in the feed gas and for air pre-purification applications typically would mean less than about 50 ppb carbon monoxide or less than 10% of the carbon monoxide content in the feed air, whichever concentration is lower. Substantially free of carbon dioxide and substantially free of water in air pre-purification applications for cryogenic air separation units are generally understood to mean a concentration of 10 ppm or less.

The pre-purification vessel is configured to operate at the usual gas flows applicable for air separation units and well-known pressures employed for pre-purification of air in air separation units, generally in the range of between about 0.2 bar(a) and about 25.0 bar(a) during regeneration and/or purification steps. Likewise, the present system and method are designed to operate at temperatures that range from 5° C. to 55° C. for the purification steps and temperatures as high as 200° C. for any regeneration steps. Tuning now to FIG. 1, there is shown a pre-purification unit 10 comprised of a vessel 15 configured to receive a feed gas stream at inlet 20 and deliver a purified gas stream at outlet 60. Within the vessel 15 there are shown seven (7) layers of materials used to purify the feed gas stream. These seven (7) layers are broadly characterized herein as defining three purification sections, as described below.

The first purification section 30 of the pre-purifier unit 10 is configured to remove impurities such as water, carbon dioxide, and optionally other impurities such as heavy hydrocarbons and oxides of nitrogen. The first purification section 30 of the pre-purifier unit 10 includes three layers of adsorbents such as activated alumina, silica gel or an X type zeolite such as NaX zeolite or combinations thereof, including adsorbent layers 32, 34, and 36.

The second purification section 40 includes a first catalyst layer of hopcalite 41 configured to remove at least some of the carbon monoxide and some of the hydrogen from the dry feed stream exiting adsorbent layer 36 and entering the second purification section 40. The second purification section 40 of the pre-purifier unit 10 further comprises a second layer 43 disposed downstream of the first layer 41 configured to remove water and carbon dioxide from the gas stream exiting the first layer 41. This second layer 43 is preferably a zeolite layer. A third layer depicted as another hopcalite catalyst layer 45 is disposed downstream of the second layer 43 and is configured to further remove hydrogen and carbon monoxide from gas stream exiting second layer 43.

The third purification section 50 of the pre-purifier unit 10 is configured to further remove any water and carbon dioxide that exit the second purification section 40 to produce a pre-purified gas stream substantially free of water, carbon dioxide, carbon monoxide hydrogen, and other impurities. The purified gas stream exits the pre-purifier unit 10 via outlet 60. The third purification section 50 is shown as one layer 52 of adsorbent such as activated alumina, silica gel or an X type zeolite, or mixtures thereof.

A plurality of flat separation screens 70 are preferably installed flush to the vessel wall between the various hopcalite catalyst layers 41, 45 and the adjacent adsorbent layers 36, 43, 52. The separation screens are preferably made of Monel due to presence of high oxygen content in the regeneration gas.

Figure 2:
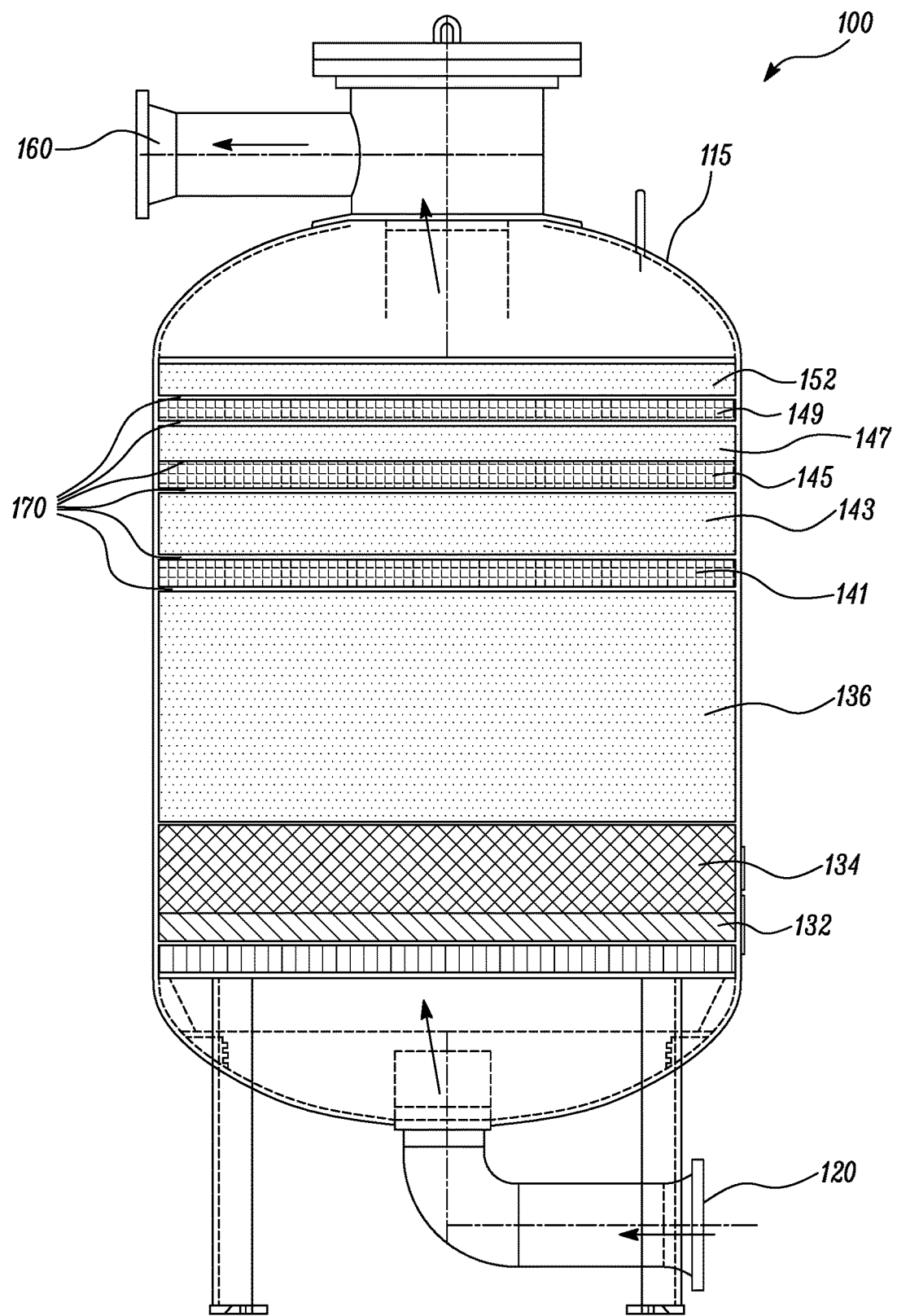
FIG. 2 depicts a partial, cross-section view of a section of an alternate embodiment of a pre-purification unit or pre-purification vessel also suitable for use in pre-purification of a feed air stream in a cryogenic air separation unit.

In the alternate embodiment shown in FIG. 2, there is a pre-purification unit 100 comprised of a vessel 115 configured to receive a feed gas stream at inlet 120 and deliver a purified gas stream at outlet 160. Within the vessel 115 there are shown nine (9) layers of materials used to purify the feed gas stream, divided generally into three purification sections. The first purification section 130 of the pre-purifier unit 100 is configured to remove impurities such as water, carbon dioxide, and optionally other impurities such as hydrocarbons and oxides of nitrogen in multiple layers 132, 134, and 136 of adsorbent materials, such as activated alumina, silica gel or an X type zeolite such as NaX zeolite or combinations thereof.

The second purification section 140 includes a first hopcalite catalyst layer 141 configured to remove at least some of the carbon monoxide and some of the hydrogen from the dry feed stream exiting adsorbent layer 136 and entering the second purification section 140. The second purification section 140 of the pre-purifier unit 100 further comprises an adsorbent layer 143 disposed downstream of the first hopcalite layer 141 configured to remove water and carbon dioxide from the gas stream exiting the first hopcalite layer 141. This adsorbent layer 143 is preferably a zeolite layer. Another hopcalite catalyst layer 145 is disposed downstream of the adsorbent layer 143 and is configured to further remove hydrogen and carbon monoxide from gas stream exiting the second layer 143. Another adsorbent layer 147 configured to remove water and carbon dioxide from the gas stream exiting the second hopcalite layer 145 is disposed downstream of the second hopcalite layer 145. Finally, a third hopcalite layer 149 configured to remove substantially all of the remaining hydrogen is disposed downstream of the adsorbent layer 147. Similar to the embodiment of FIG. 1, a plurality of Monel separation screens 170 are preferably installed between the various hopcalite catalyst layers 141, 145, 149 and the adjacent adsorbent layers 136, 143, 147, 152.

The third purification section 150 of the pre-purifier unit 100 is shown as one layer 152 of adsorbent such as activated alumina, silica gel or an X type zeolite, or mixtures thereof and is configured to further remove any water and carbon dioxide that exit the second purification section 140 to produce a pre-purified gas stream substantially free of water, carbon dioxide, carbon monoxide hydrogen, and other impurities.

In both embodiments depicted in FIGS. 1 and 2, the second purification sections 40, 140 of the pre-purifier units 10, 100 may be broadly characterized as having two or more separate layers of hopcalite with the successive layers of the hopcalite separated by a zeolite adsorbent layer that removes water and carbon dioxide produced in the hopcalite layers.

Figure 3:
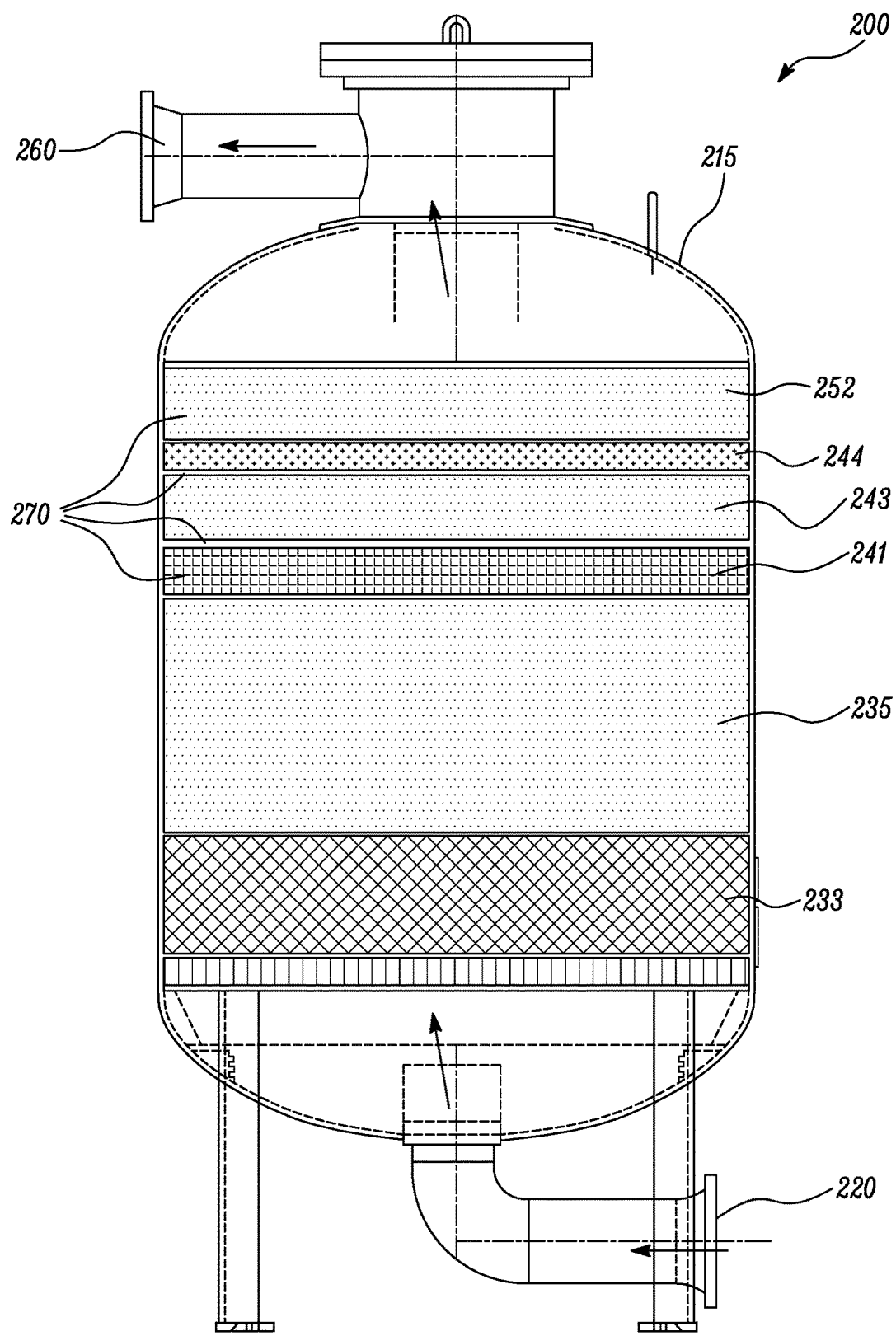
FIG. 3 depicts a partial, cross-section view of a section of yet another embodiment of a pre-purification unit or pre-purification vessel also suitable for use in pre-purification of a feed air stream in a cryogenic air separation unit.

Tuning now to FIG. 3, there is shown yet another embodiment of the present system and method for pre-purification of a feed gas stream that includes a vessel 215 configured to receive a feed gas stream at inlet 220 and deliver a purified gas stream at outlet 260. In the embodiment shown in FIG. 3, the first purification section 230 includes a layer of alumina 233 and a layer of zeolite based molecular sieve 235 while the third purification section 250 of the pre-purifier unit 200 is configured with a capping layer 252 of zeolite based molecular sieve to remove impurities such as water, carbon dioxide exiting the second purification section 240. As with the embodiments shown and described with reference to FIGS. 1 and 2, the various layers of adsorbent materials in the first and third purification sections may be activated alumina, silica gel or an X type zeolites or combinations thereof to remove impurities such as water, carbon dioxide, and optionally other impurities in the gas streams flowing through such layers.

The second purification section 240 of the pre-purifier unit 200, on the other hand includes a hopcalite catalyst layer 241 configured to remove most of the carbon monoxide and some of the hydrogen from the dry gas stream exiting adsorbent layer 236 and entering the second purification section 240 followed by an adsorbent layer 243 disposed downstream of the hopcalite layer 241 configured to remove water and carbon dioxide from the gas stream exiting the hopcalite layer 241. This adsorbent layer 243 is preferably a zeolite based molecular sieve. Different from the embodiments shown and described with reference to FIGS. 1 and 2, the embodiment shown in FIG. 3 includes a layer of noble metal catalyst such as 0.5 wt % $Pd/Al_2O_3$ instead of additional hopcalite catalyst layers. In the layer of noble metal catalyst 244, and hydrogen from the intermediate gas stream exiting adsorbent layer 243 that has been cleansed of carbon dioxide and water is partially oxidized to water and/or adsorbed by this catalyst layer 244 while any residual carbon monoxide escaping the upstream hopcalite layer may also be oxidized in this layer. Much of the water produced in the partial oxidation of hydrogen may be adsorbed in the $Al_2O_3$ catalyst support while some of the water and carbon dioxide produced will continue to the third purification section 250. A plurality of Monel separation screens 270 are preferably installed between the various hopcalite catalyst layers 241 or catalyst layer 244 and the adjacent adsorbent layers 236, 243, 252.

As is well known in the art, air pre-purification systems use two or more pre-purification units or vessels so as to allow continuous production of purified air. When one or more of the pre-purification units is purifying the feed air, one or more other pre-purification units are being regenerated, preferably using a process widely known as thermal regeneration. The thermal regeneration process acts to desorbs the water and carbon dioxide from various layers in the pre-purifier units while also restoring the hydrogen adsorption capacity of the hopcalite catalyst layers and other catalyst layers.

Thermal regeneration is preferably done using a multi-step process that often involves the following four steps: (i) depressurizing the vessel to lower pressures suitable for regeneration; (ii) heating the layers within the vessel to desorb the water and carbon dioxide from various layers and restore the hydrogen adsorption capacity of the hopcalite catalyst layers and/or other catalyst layers; (iii) cooling the layers within the vessel back to temperatures suitable for the purification process; and (iv) repressurizing the vessel back to the higher operating pressures required for the purification process. While thermal regeneration is preferred, it is contemplated that the present system and methods could be used with pressure swing adsorption based pre-purifiers or even hybrid type pre-purifiers.

Thermal regeneration is preferably conducted at lower pressures such as 1.0 to 1.5 bar(a) compared to the purification process and must be conducted at temperatures of at least 180° C., and more preferably at temperatures of about 190° C., or more, subject to appropriate safety requirements. The heating step in the thermal regeneration process is typically conducted by heating a purge gas to produce a stream of hot purge gas which is fed to vessel via outlet 60, 160, 260 and which traverses the layers of the pre-purifier unit 10, 100, 200 in reverse order compared to the above-described purification process. In many applications, the purge gas may be taken as a portion of the product gas or from waste gas from the distillation columns of the cryogenic air separation unit. As the hot purge gas passes through the various sections and layers of the pre-purifier unit 10, 100, 200, the catalyst layers and adsorbent layers are regenerated. The effluent purge gas exiting the pre-purification unit 10, 100, 200 via the inlet 20, 120, 220 is typically vented. After the catalyst layers and adsorbent layers are heated and regenerated, the pre-purification unit is then cooled using a cool purge gas generally at a temperature from about 10° C. up to 50° C. that flows through the pre-purification unit in the same direction as the hot purge gas. After cooling, the vessel is repressurized to the higher operating pressures required by the purification process.

The regeneration steps are conducted as described for a predetermined period of time, typically referred to as the cycle time after which the service or functions of the pre-purification units are switched so that vessels previously regenerating come "on line' and initiates the purification process while vessels previously purifying the feed air go "off-line' and initiate the regeneration process. Typical pre-purification cycle times for high-purity or ultra-high purity nitrogen producing air separation plants is between about 240 minutes and 480 minutes. In this manner, each pre-purification unit alternates between purification service and regeneration service to maintain continuous production of purified air substantially free of carbon dioxide, water, carbon monoxide, hydrogen and other impurities.

The pre-purifier vessels depicted in FIGS. 1-3. are preferably dense loaded. Dense loading provides the most consistent and uniform packing of adsorbents and catalysts with minimal leveling of the layers required. Furthermore, dense packing minimizes adsorbent settling. Such dense packing for pre-purifiers designed for carbon monoxide and hydrogen removal is optional and may be utilized for all layers in the bed to ensure integrity and uniform depth. Because of relatively thin layers in second purification section for removal of carbon monoxide and hydrogen, including multiple layers of hopcalite and adsorbent layers, as well as any noble metal based catalyst that may be used, it is important to minimize the shifting and/or settling of the layers in order to maintain a uniform depth of the layers over the life of the pre-purifier unit.

Example 1

The embodiment of FIG. 1 has been evaluated using computer based simulations and models to demonstrate the expected performance of the pre-purification unit and Table 1 shows modeling data for the gas streams entering the pre-purifier and exiting each individual layer of material in the pre-purifier unit. The flow rate through the pre-purifier is modeled at about 99000 $Nm^3/h$ for a cycle time of between 2 to 6 hours. For sake of brevity and simplicity, the following discussion focuses on the second purification section of the pre-purifier unit in an effort to demonstrate performance and cost benefits of this arrangement compared to prior art pre-purification systems.

TABLE 1

| PPU Layer | Material | Length | Impurities (at Exit of Layer) | | | |
| --- | --- | --- | --- | --- | --- | --- |
| | | | CO(ppb) | $H_2$(ppb) | $H_2O$(ppm) | $CO_2$(ppm) |
| PPU Inlet | — | — | 1000 | 1000 | 2000 | 450 |
| Section 1 - Layer 1 | Alumina | 10 cm | 1000 | 1000 | 2000 | 450 |
| Section 1 - Layer 2 | Alumina | 40 cm | 1000 | 1000 | 10 | 450 |
| Section 1 - Layer 3 | Zeolite | 100 cm | 1000 | 1000 | <0.01 | <0.1 |
| Section 2 - Layer 4 | Hopcalite | 18 cm | <1 | 100 | <1.0 | 1.0 |
| Section 2 - Layer 5 | Zeolite | 20 cm | <1 | 100 | <0.01 | <0.01 |
| Section 2 - Layer 6 | Hopcalite | 10 cm | <0.1 | 5 | <0.1 | <0.1 |
| Section 3 - Layer 7 | Zeolite | 20 cm | <0.1 | 5 | <0.01 | <0.01 |
| PPU Outlet | — | — | <0.1 | 5 | <0.01 | <0.01 |

With reference to the data in Table 1 for this two-layer hopcalite based arrangement, the initial hopcalite layer or first catalyst layer is about 18 cm in length and configured to remove most of the carbon monoxide via an oxidation with the copper and magnesium oxides in the catalyst layer to produce carbon dioxide most of which may be adsorbed in the hopcalite layer and some of which exits the first catalyst layer. Concurrently, a first portion of the hydrogen in the gas stream traversing the first catalyst layer is oxidized to produce water while a second portion of the hydrogen in the gas stream traversing the first catalyst layer is adsorbed in the first catalyst layer while a third portion of the hydrogen impurities in the gas stream traversing the first catalyst layer passes through the first catalyst layer. The hydrogen and carbon monoxide profiles depicted in Table 1 shows a distinct increase in water impurities and carbon dioxide in the gas stream exiting the first catalyst layer (i.e. not absorbed in the first catalyst layer), presumably from oxidation of the hydrogen and carbon monoxide, respectively. The hydrogen reduction from about 1000 ppb to 100 ppb is a net reduction of about 90% while the carbon monoxide shows a net reduction of about 99.9% from about 1000 ppb to about 1.0 ppb. Note that the hydrogen impurities are being removed in this first hopcalite layer at an average rate of 5.0% per cm of hopcalite.

The second layer in the second section of the pre-purifier unit is a zeolite based adsorbent about 20 cm in length that removes the water impurities from about 1.0 ppm to about 0.01 ppm and also removes carbon dioxide from about 1.0 ppm to less than about 0.01 ppm.

The third layer in the second section of the pre-purifier unit is a second hopcalite layer about 10 cm in length that receives the gas stream cleansed of water and carbon dioxide exiting the second layer and is configured to further remove the hydrogen from about 100 ppm to about 5 ppm for a reduction of about 95% of the remaining hydrogen and removes any remaining carbon monoxide to levels below 0.1 ppb resulting in a gas substantially free of carbon monoxide. Put another way, in this third layer the hydrogen impurities are being removed at an average rate of 9.5% per cm of hopcalite compared to an average rate of hydrogen removal of 5.0% per cm of hopcalite in the first layer of hopcalite catalyst. Again, the removal of hydrogen and substantially all of the carbon monoxide yields an exit gas with less than about 0.1 ppm water and less than about 0.1 ppm of carbon dioxide, with much of the produced water and carbon monoxide being adsorbed in the third layer (i.e. second hopcalite layer).

Example 2

The embodiment of FIG. 2 has also been evaluated using computer based simulations and models to also demonstrate the expected performance of the depicted multi-layer hopcalite based pre-purification unit and Table 2 shows modeling data for the gas streams entering the pre-purifier shown and described with reference to FIG. 2. As with the discussion above regarding the data in Table 1, the materials are the same as in the previous example and the flow rate of the air through the pre-purifier is also modeled at 99000 $Nm^3/h$ for a cycle time of between 2 hours and 6 hours.

TABLE 2

| PPU Layer | Material | Length | Impurities (at Exit of Layer) | | | |
|---|---|---|---|---|---|---|
| | | | CO(ppb) | $H_2$(ppb) | $H_2O$(ppm) | $CO_2$(ppm) |
| PPU Inlet | — | — | 1000 | 1000 | 2000 | 450 |
| Section 1 - Layer 1 | Alumina | 10 cm | 1000 | 1000 | 2000 | 450 |
| Section 1 - Layer 2 | Alumina | 40 cm | 1000 | 1000 | 10 | 450 |
| Section 1 - Layer 3 | Zeolite | 100 cm | 1000 | 1000 | <0.01 | <0.1 |
| Section 2 - Layer 4 | Hopcalite | 10 cm | <1 | 321 | <0.7 | 1.0 |
| Section 2 - Layer 5 | Zeolite | 20 cm | <1 | 321 | <0.01 | <0.01 |
| Section 2 - Layer 6 | Hopcalite | 10 cm | <0.1 | 60 | <0.3 | <0.1 |
| Section 2 - Layer 7 | Zeolite | 10 cm | <0.1 | 60 | <0.01 | <0.01 |
| Section 2 - Layer 8 | Hopcalite | 8 cm | <0.1 | 5 | <0.05 | <0.01 |
| Section 3 - Layer 9 | Zeolite | 10 cm | <0.1 | 5 | <0.01 | <0.01 |
| PPU Outlet | — | — | <0.1 | 5 | <0.01 | <0.01 |

With reference to the data in Table 2 and focusing on the second section of the pre-purifier unit which comprises a multi-layer hopcalite based arrangement, the initial hopcalite layer or first catalyst layer in the second purification section, identified as layer 4 in Table 2, is about 10 cm in length and configured to remove most of the carbon monoxide via an oxidation in the catalyst layer to produce carbon dioxide most of which may be adsorbed in hopcalite layer and some of which exits the first catalyst layer. Concurrently, a first portion of the hydrogen in the gas stream traversing the first catalyst layer is oxidized to produce water while a second portion of the hydrogen in the gas stream traversing the first catalyst layer is adsorbed while a third portion of the hydrogen impurities in the gas stream traversing the first catalyst layer passes through the first catalyst layer. The hydrogen and carbon monoxide profiles depicted in Table 2 shows a distinct increase in water impurities and carbon dioxide in the gas stream exiting the first catalyst layer (i.e. impurities not absorbed in the first catalyst layer), presumably produced from oxidation of hydrogen and carbon monoxide, respectively. The hydrogen reduction from about 1000 ppb to 321 ppb is a net reduction of only about 68% while the carbon monoxide shows a net reduction of about 99.9% from 1000 ppb to about 1.0 ppb.

The second layer in the second section of the pre-purifier unit identified as layer 5 is a zeolite based adsorbent about 20 cm in length that removes the water impurities from about 0.7 ppm to about 0.01 ppm and removes carbon dioxide from about 1.0 ppm to less than 0.01 ppm.

The third layer in the second section of the pre-purifier unit identified as layer 6 is another hopcalite layer about 10 cm in length that receives the gas stream cleansed of water and carbon dioxide exiting the second layer and is configured to further remove the hydrogen from about 321 ppm to about 60 ppm for a reduction of about 81% of the remaining hydrogen and removes any remaining carbon monoxide to levels below 0.1 ppb resulting in a gas substantially free of carbon monoxide. Again, the removal of hydrogen and substantially all of the carbon monoxide yields an exit gas with about 0.3 ppm water and up to about 0.1 ppm of carbon dioxide, with much of the produced water and carbon monoxide being adsorbed in the third layer (i.e. second hopcalite layer).

The fourth layer in the second section of the pre-purifier unit identified as layer 7 is another zeolite based adsorbent that again removes the water impurities from about 0.3 ppm back down to about 0.01 ppm level and removes carbon dioxide from about 0.1 ppm to less than 0.01 ppm levels. This fourth layer of zeolite based adsorbent is only about 10 cm in length, thus helping reduce cost of materials.

The fifth layer in the second section of the pre-purifier unit is identified as layer 7 and is yet another hopcalite layer of only about 8.0 cm in length that receives the gas stream exiting the fourth layer and is configured to further remove most of the remaining hydrogen impurities from about 60 ppb level to about 5 ppb level for a reduction of about 92% of the remaining hydrogen to yield an effluent gas that is substantially free of both hydrogen and carbon monoxide.

Advantageously, by using this multi-layer arrangement with multiple layers of hopcalite separated by intermediate layers of an adsorbent configured to remove water and carbon dioxide, there is a noticeable improvement in hydrogen removal capacity. In the modeled arrangement, the first hopcalite layer is 10 cm in length and removes 68% of the hydrogen in the stream traversing that first hopcalite layer whereas the second hopcalite layer is also 10 cm in length yet removes 81% of the hydrogen in the stream traversing that second hopcalite layer. The third hopcalite layer is only about 8 cm in length yet removes about 92% of the hydrogen in the stream traversing that third hopcalite layer. In this manner, hydrogen removal is performed in a cascading manner where the efficiency of hydrogen removal improves in successive hopcalite layers.

Without being bound by any particular theory or design limitations, using a multi-layer, hopcalite based pre-purifier design with this cascading hydrogen removal, one can improve hydrogen removal by designing the first hopcalite layer to remove between 50% and less than 90% of the hydrogen in the feed stream, and in some embodiments remove between 50% and less than 75% of the hydrogen in the feed stream. The last hopcalite layer is preferably configured to remove more than 90% of the hydrogen entering the last hopcalite layer. Intermediate hopcalite layers, if used, are preferably designed or configured to remove relatively more hydrogen than the preceding hopcalite layer, measured as a percentage of hydrogen in the gas stream entering the hopcalite layer. Intermediate hopcalite layers can be preferably configured to remove between 51% and 89% of the hydrogen entering that intermediate hopcalite layer.

Example 3

Figure 4:
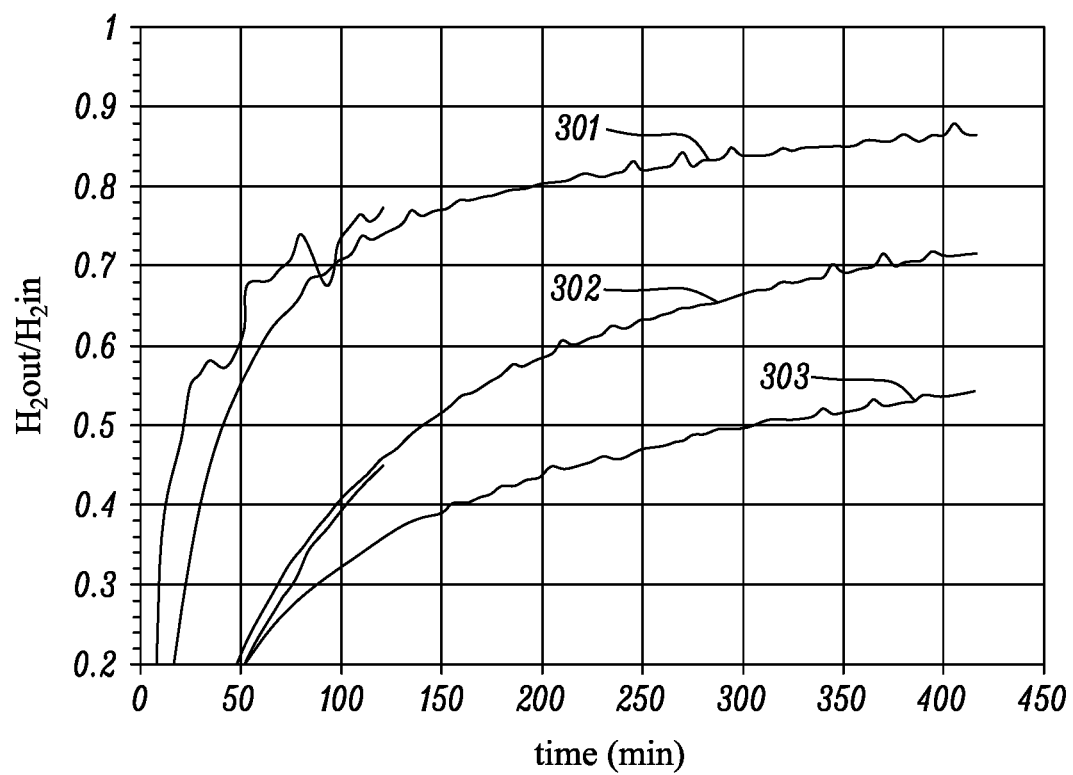
FIG. 4 is a graph that shows experimental data relating to hydrogen removal as a function of time for certain hopcalite catalysts.

FIG. 4 shows a graph of data obtained from a plurality of laboratory tests showing the hydrogen removal characteristics of a hopcalite catalyst, specifically a 22.86 cm long bed of Carulite®. The laboratory tests passed air at a temperature of 20° C. (i.e. curve 301) or 40° C. (i.e. curves 302 and 303), a pressure of about 9.6 bar(a), and a flow rate of 13.3 slpm. The feed air stream had 3 ppm of hydrogen and either 10 ppm of carbon monoxide (i.e. curves 301 and 302) or 1 ppm of carbon monoxide (i.e. curve 303).

As seen in FIG. 4, the ratio of hydrogen concentration exiting the bed of Carulite catalyst to the hydrogen concentration entering the bed of Carulite catalyst as a function of time is shown for three multiple different conditions. Curve 301 represents test conditions with the air stream at 20° C., the hydrogen level at the inlet of 3 ppm and the carbon monoxide level at the inlet of 10 ppm and shows a hydrogen ratio of about 0.7 after 100 minutes and about 0.85 after 350 minutes. Increasing the temperature to 40° C., while keeping the 3 ppm hydrogen level at the inlet and 10 ppm carbon monoxide level at the inlet improves the hydrogen removal performance as shown in curve 302. Specifically, curve 302 shows a hydrogen ratio of about 0.4 after 100 minutes and about 0.7 after 350 minutes. Curve 303 shows even better hydrogen removal performance with the feed air temperature at 40° C. but reducing the carbon monoxide concentration in the feed air to 1 ppm while keeping the 3 ppm hydrogen impurity level at the inlet. Specifically, curve 303 shows a hydrogen ratio of about 0.3 after 100 minutes and about 0.5 after 350 minutes. The improved hydrogen reduction between curves 302 and 303 suggests that the hydrogen removal performance in a second and/or third layers of hopcalite 45, 145, 149 in the embodiments shown in FIGS. 1 and/or 2 will be improved because the carbon monoxide impurity levels entering the second and/or third layers of hopcalite is less than 1 ppm as shown in Tables 1 and 2.

Example 4

Figure 5:
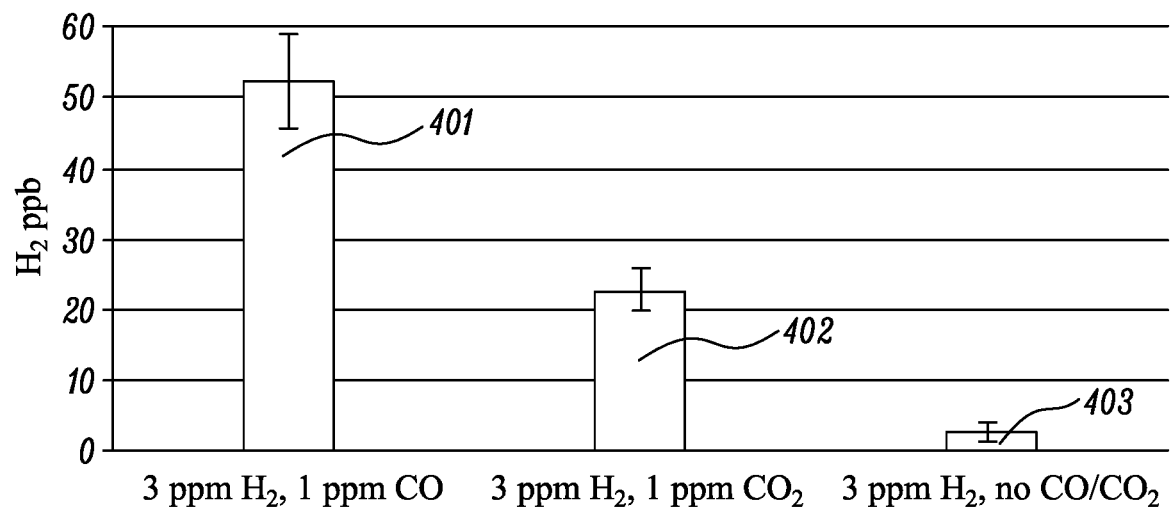
FIG. 5 is a bar chart that shows experimental data relating to effect of carbon monoxide and carbon dioxide on hydrogen removal for certain palladium based catalyst materials after an 8 hour cycle time.

FIG. 5 shows a graph of data obtained from a plurality of laboratory tests showing the hydrogen removal characteristics of a 22.86 cm long bed of a palladium based catalyst such as 0.5 wt % $Pd/Al_2O_3$. In this example, synthetic air at a pressure of about 11 bar(a), a temperature of 10° C. is passed through a tube containing the palladium based catalyst for a cycle time of about 480 minutes. The feed air stream had 3 ppm of hydrogen impurities and either 1 ppm of carbon monoxide impurities (i.e. bar 401) or 1 ppm of carbon dioxide (i.e. bar 402) or no carbon monoxide and no carbon dioxide impurities (i.e. curve 403). The height of each bar is representative of the average hydrogen breakthrough at the end of the 480 minute cycle across multiple tests.

As seen in FIG. 5, the average hydrogen concentration exiting the tube of catalyst at the end of the 480 minute cycle when the feed air has 3 ppm hydrogen and 1 ppm carbon monoxide is over 50 ppb (i.e. bar 401). Comparatively, the average hydrogen concentration exiting the tube of catalyst at the end of the 480 minute cycle when the feed air has 3 ppm hydrogen and 1 ppm carbon dioxide is just over 20 ppb, suggesting hydrogen removal in the catalyst is improved if the treated stream has less carbon monoxide. However, the average hydrogen concentration exiting the tube of catalyst at the end of the 480 minute cycle when the feed air has 3 ppm hydrogen and little or no carbon dioxide or carbon dioxide is less than 5 ppb, suggesting hydrogen removal in the catalyst is improved if the treated stream has substantially no carbon dioxide and no carbon monoxide.

The improved hydrogen reduction shown in bar 403 compared to hydrogen reduction depicted by curves 401 and 402 further suggests that the hydrogen removal performance in a palladium based catalyst layer 244 in the embodiment of FIG. 3 will be improved by the presence of adsorbent layer 243 which removes carbon dioxide and water before the gas stream enters the palladium catalyst layer. In addition, this data also suggests that the hydrogen removal performance in the second and/or third layers 45, 145, 149 of hopcalite in the embodiments shown in FIGS. 1 and/or 2 will be improved because of the prior hopcalite layers and adjacent adsorbent layers causing the gas stream entering the second and/or third layer of hopcalite layers to be substantially free of carbon monoxide and carbon dioxide as shown in Tables 1 and 2.

While the present system and method have been described with reference to a preferred embodiment or embodiments, it is understood that numerous additions, changes and omissions can be made without departing from the spirit and scope of the present invention as set forth in the appended claims.

What is claimed is:

1. A method of purifying a gas stream to remove the hydrogen and carbon monoxide impurities present in the gas stream, the method comprising:
    (a) passing the gas stream substantially free of carbon dioxide and water through a first catalyst layer comprising a mixture manganese and copper oxides configured to remove at least some of the carbon monoxide and hydrogen from the gas stream and produce a first intermediate effluent;
    (b) passing the first intermediate effluent through an adsorbent layer disposed downstream of the first catalyst layer, the adsorbent layer configured to remove water and carbon dioxide from the intermediate effluent and produce a second intermediate effluent; and
    (c) passing the second intermediate effluent through a second catalyst layer disposed downstream of the adsorbent layer, the second catalyst layer configured to remove at least hydrogen from the second intermediate effluent to yield an intermediate purified stream.

2. The method of claim 1, wherein the intermediate purified stream is substantially free of carbon monoxide.

3. The method of claim 1, wherein the second catalyst layer comprises a noble metal based catalyst configured to remove hydrogen from the second intermediate effluent to yield the intermediate purified stream.

4. The method of claim 3, wherein the noble metal based catalyst layer comprises a palladium catalyst layer.

5. The method of claim 3, wherein the noble metal based catalyst layer comprises a mixture of palladium and aluminum oxide.

6. The method of claim 1, wherein the adsorbent layer comprises a molecular sieve layer or a layer of alumina or both a molecular sieve layer and a layer of alumina.

7. The method of claim 1, further comprises the step of:
    (d) passing the intermediate purified stream through a second adsorbent layer disposed downstream of the second catalyst layer, the second adsorbent layer configured to remove water and carbon dioxide from the intermediate purified stream and produce a purified stream.

8. The method of claim 1, wherein the gas stream is a stream of feed air for use in an air separation unit and the purified stream is a purified, dry air stream.

9. A pre-purification vessel configured for use with an air-separation unit comprising:
    a pre-purification vessel having an inlet configured to receive a stream of compressed feed air and an outlet configured to direct a purified, dry air stream substantially free of water, carbon dioxide, carbon monoxide and hydrogen;
    a first purification section disposed within the pre-purification vessel comprising at least one layer of adsorbent configured to remove water and carbon dioxide from the compressed feed air stream and yield a dry feed air stream substantially free of water and carbon dioxide;

a second purification section disposed within the pre-purification vessel downstream of the first purification section, the second purification section comprising a first catalyst layer comprising a mixture manganese and copper oxides configured to remove at least some of the carbon monoxide and hydrogen from the dry feed air stream and produce a first intermediate effluent; an adsorbent layer disposed downstream of the first catalyst layer, the adsorbent layer configured to remove water and carbon dioxide from the first intermediate effluent and produce a second intermediate effluent; and a second catalyst layer disposed downstream of the adsorbent layer, the second catalyst layer configured to remove at least hydrogen from the second intermediate effluent to yield an intermediate purified air stream; and a third purification section disposed within the vessel downstream of the second purification section and comprising at least one other layer of adsorbent configured to remove water and carbon dioxide from the intermediate purified air stream and yield a dry, purified air stream substantially free of water, carbon dioxide, carbon monoxide and hydrogen.

10. The pre-purification vessel of claim 9, wherein the intermediate purified air stream is substantially free of carbon monoxide.

11. The pre-purification vessel of claim 9, wherein the second catalyst layer comprises a noble metal based catalyst configured to remove hydrogen from the second intermediate effluent to yield the intermediate purified air stream.

12. The pre-purification vessel of claim 11, wherein the noble metal based catalyst layer comprises a palladium catalyst layer.

13. The pre-purification vessel of claim 11, wherein the noble metal based catalyst layer comprises a mixture of palladium and aluminum oxide.

14. The pre-purification vessel of claim 9, wherein the adsorbent layers comprises a molecular sieve layer or a layer of alumina or both a molecular sieve layer and a layer of alumina.

\* \* \* \* \*